US006934941B2

United States Patent
Kamiya et al.

(10) Patent No.: US 6,934,941 B2
(45) Date of Patent: Aug. 23, 2005

(54) COMPILER FOR GENERATING RISC OBJECT CODE WHEREBY OPERATIONS ON BIT VARIABLES WRITTEN IN SOURCE CODE ARE EXECUTED BY PROCESSING BASED ON BIT JUDGEMENT OPERATIONS TO THEREBY REDUCE THE AMOUNT OF OBJECT CODE

(75) Inventors: Masahiro Kamiya, Nishio (JP); Kunitaka Egawa, Anjo (JP); Hiroshi Matsuda, Okazaki (JP); Hideaki Ishihara, Okazaki (JP)

(73) Assignee: Denso Corporation, Kariya (JP)

( * ) Notice: Subject to any disclaimer, the term of this patent is extended or adjusted under 35 U.S.C. 154(b) by 551 days.

(21) Appl. No.: 09/935,686

(22) Filed: Aug. 24, 2001

(65) Prior Publication Data

US 2002/0042695 A1 Apr. 11, 2002

(30) Foreign Application Priority Data

Aug. 28, 2000 (JP) ........................................ 2000-257184

(51) Int. Cl.$^7$ ................................................ G06F 9/45
(52) U.S. Cl. ........................ 717/153; 717/137; 717/139; 717/149
(58) Field of Search ................................. 717/106–107, 717/136–161; 712/200–215, 220–236

(56) References Cited

U.S. PATENT DOCUMENTS 5,045,992 A     9/1991  Yates, Jr. et al.
6,745,320 B1 *  6/2004  Mitsuishi .................... 712/225

OTHER PUBLICATIONS

UTMC Microelectronic Systems Inc., "UT1750AR RISC Assembly Language Manual", http://wwwold.utmc.com/products/17510riscassy.pdf, pp. 1–54, Oct. 1998.*

* cited by examiner

*Primary Examiner*—Ted T. Vo
(74) *Attorney, Agent, or Firm*—Posz Law Group, PLC

(57) ABSTRACT

A computer program compiler generates object code to be executed by a RISC type of CPU, whereby in effect each bit operational expression appearing in the source code, such as an AND operation on two bit variables, is converted to an operation whereby the respective values of the bit variables which are operands of that expression are judged, and a specific binary value is assigned as the result of the bit operational expression based upon the judgement results, to thereby substantially reduce the number of RISC object code instructions corresponding to such an operation.

20 Claims, 6 Drawing Sheets

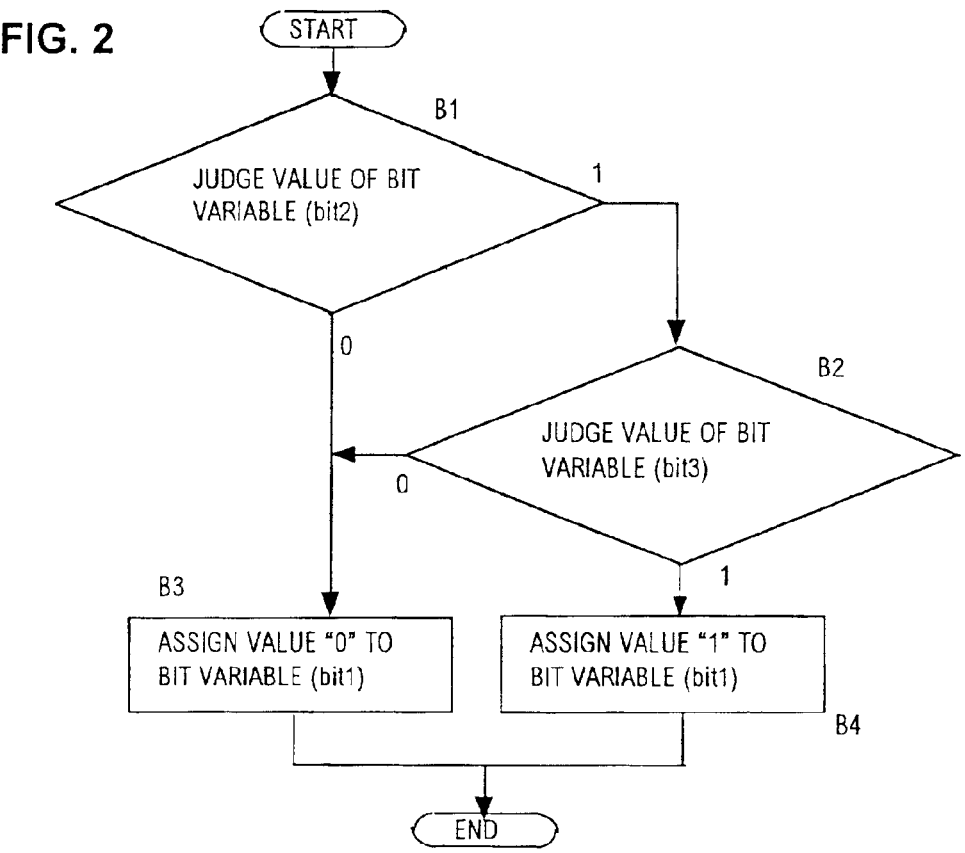

FIG. 7

```
mov    BIT2, reg1  ⎫
                   ⎪
shrl   reg1, reg1  ⎪   C1: READ OUT A BIT
                   ⎬   VARIABLE (bit2) AND LOAD
shrl   reg1, reg1  ⎪   INTO A GENERAL-PURPOSE
                   ⎪   REGISTER (reg1)
shrl   reg1, reg1  ⎪
                   ⎪
and    #$0001, reg1⎭ mov    BIT3, reg2  ⎫
                   ⎪
shrl   reg2, reg2  ⎪   C2: READ OUT A BIT
                   ⎬   VARIABLE (bit3) AND
shrl   reg2, reg2  ⎪   LOAD INTO A GENERAL-
                   ⎪   PURPOSE REGISTER (reg2)
shrl   reg2, reg2  ⎪
                   ⎪
and    #$0001, reg2⎭ and    reg2, reg1   ······ C3: DERIVE THE LOGIC PRODUCT
                            OF THE VALUES OF bit2 AND bit3 shll   reg1, reg1  ⎫
                   ⎪
shll   reg1, reg1  ⎪
                   ⎪
shll   reg1, reg1  ⎪
                   ⎬   C4: ASSIGN THE RESULT OF
mov    BIT1, reg2  ⎪   THE LOGIC PRODUCT (FROM
                   ⎪   reg1) AS THE VALUE OF A BIT
and    #$fff7, reg2⎪   VARIABLE (bit1)
                   ⎪
or     reg1, reg2  ⎪
                   ⎪
mov    reg2, BIT1  ⎭
```

COMPILER FOR GENERATING RISC OBJECT CODE WHEREBY OPERATIONS ON BIT VARIABLES WRITTEN IN SOURCE CODE ARE EXECUTED BY PROCESSING BASED ON BIT JUDGEMENT OPERATIONS TO THEREBY REDUCE THE AMOUNT OF OBJECT CODE

BACKGROUND OF THE INVENTION

1. Field of Application

The present invention relates to a compiler for generating object code to be executed by a RISC (Reduced Instruction Set Computer) type of CPU (Central Processing Unit), from source code of a computer program, and to a microcomputer having the object code stored in a program memory.

2. Description of Prior Art

Development of a program to be executed by a computer is generally performed by first writing the program as source code, in a high-level programing language such as C or C++. The source code is then compiled, i.e., converted by execution of a program referred to as a compiler, into object code consisting of successive instructions in machine language, which can be directly executed by the CPU of a computer. After the program source code has been compiled, the object code of the program is stored in memory at the computer which will utilize it, and the program can then be executed.

A RISC type of CPU is configured for execution of instructions from among a small set of object code instructions, which perform respective simple functions and can have short execution times. Each stage of a program, such as performing a "fetch", "decode", "write" operation, etc., is performed by executing a relatively large number of the RISC instructions, with these being executed in parallel as far as possible (i.e., using pipeline operation) in order to maximize the program execution speed. However the amount of such RISC object code that is generated from the source code of a program by the compiler is substantially greater than that which would be generated for the same program in the case of a CISC (Complex Instruction Set Computer) type of CPU.

FIG. 7 shows an instruction list that is an example of object code that might be generated by a prior art type of compiler for execution by a RISC type of CPU, for the following portion of source code:

$$bit1 = bit2 \ \& \ bit3 \tag{1}$$

Here, bit1, bit2 and bit3 are names of respective bit variables, and the expression performs the AND logic function to obtain the logic product of the values of bit2 and bit3, and assigns the value of the result to the bit variable named bit1. An expression such as (1) above, which performs an operation on bit variables to obtain a result value which is assigned to a specified bit variable, will be referred to in the following and in the appended claims as a bit operational expression. It will be assumed that each of bit1, bit2 and bit3 is the fourth bit within a corresponding 8-bit variable (i.e., counting from the LSB of the 8-bit variable as the first bit). The 8-bit variables respectively containing bit1, bit2 and bit3 will be designated BIT1, BIT2 and BIT3 respectively.

FIG. 8 is a simple flow diagram showing the processing which would be executed by a prior art compiler to convert the source code of the above bit operational expression into object code. A1, A2, A3, and A4 designate successively generated portions of the object code.

In FIG. 7, the portion C1 of the object code effects an operation whereby the contents of the 8-bit variable BIT2 (which are held in memory) are read into a general-purpose register named reg1, then the contents of that register are right-shifted by three bit positions so that the desired fourth bit of the 8-bit variable is set in the LSB position in register reg1. The logic product of the contents of register reg1 and a set of mask data #$0001 (where the $ symbol indicates a base-16 number) is then derived, to thereby clear all of the bit positions in register reg1 other than the LSB position. The above portion C1 in FIG. 7 corresponds to step A1 in FIG. 8.

Portion C2 of the object code in FIG. 7 effects the same processing as that described above for the portion C1, but applied to the bit variable bit3 and utilizing a second general-purpose register, named reg2. This corresponds to step A2 in FIG. 8.

Portion C3 of the object code in FIG. 7 constitutes processing whereby the logic product of the respective contents of registers reg1 and reg2 is obtained. This corresponds to step A3 in FIG. 8. Next, in portion C4, the result of the logic product operation (which remains in register reg1) is left-shifted by three bit positions, then the contents of the 8-bit variable BIT1 are read into register reg2, and the logic product of the contents of register reg2 and the set of mask data bits #$fff7 is obtained, to thereby clear the bit which is at the fourth bit position in register reg2 while leaving the other contents of that register unchanged. The logic sum of the contents of the registers reg1, reg2 is then obtained, with the result of that operation being left in register reg2. The contents of register reg2 are then written into memory, to replace the previous contents of the 8-bit variable BIT1. This corresponds to step A4 in FIG. 8. This completes the processing sequence shown.

With a RISC type of CPU, since the instruction set is small, there are no dedicated instructions for reading out the values of bit variables. Hence it is necessary to use a plurality of other instructions, in combination, to perform such a function. As a result, in order to execute a bit operation which is written in source code as a single program step, it is necessary to use a total of 18 steps in the object code that is to be executed by a RISC CPU, with the example of FIG. 8. Hence, the memory capacity required to store a program that is to be executed by a RISC type of CPU becomes large, while in addition, the greater the number of steps that must be processed, the lower will become the program execution speed.

In the following, an expression representing processing whereby the value of a specified bit variable is judged or the respective values of a plurality of specified bit variables are judged, to obtain a binary (i.e., "true" or "false") result and whereby specified operations are performed based on the judgement result, will be referred to as a condition judgement expression.

SUMMARY OF THE INVENTION

It is an objective of the present invention to overcome the disadvantages associated with use of RISC object code in the prior art, as set out above, by providing a compiler for generating object code to be executed by a microcomputer having a RISC type of CPU, whereby the amount of object code that is generated for a program is substantially less than in the prior art and the program execution speed of can be increased.

More specifically, according to a first aspect, the invention provides a compiler for generating object code to be executed by a microcomputer having a RISC type of CPU, whereby when there is a bit operational expression written within the source code for a program, a corresponding portion of object code is generated by the compiler for performing the following functions:

(a) executing a condition judgement operation to obtain a "true" or a "false" decision, based on judging the respective values of the bit variables which are operands of the bit operational expression, and (b) assigning a predetermined first binary value to the bit variable which constitutes the result of the bit operational expression, when a "true" judgement result is obtained and assigning a predetermined second binary value as the result of the bit operational expression when a "false" judgement result is obtained.

For example if the bit operation is to obtain the logic product of the values of two bit variables m and n and to set the result as the value of the bit variable p, i.e.:

$$p=m \& n \qquad (2)$$

then the result obtained from the right-side portion of this bit operational expression, i.e., "m & n", will be "1" only if both m and also n have the value "1". If for example this bit operational expression were to be written using an "if" or "while" statement in C programing language, then it would appear in the source code as follows:

$$m==1 \&\& n==1 \qquad (3)$$

In that case if the result of executing the statement (3), whereby a condition judgement operation is performed, is "true" , then "1" is assigned as the value of the bit variable p at the left side of the bit operational expression (2), i.e., as the value of the result obtained for the bit operational expression, while if the result obtained from the condition judgement operation of statement (3) is "false" then "0" is assigned as the value of p. In that way, a bit operational expression can be replaced by a condition judgement expression.

With the present invention, each bit operational expression which appears within the source code is replaced by object code for a condition judgement expression, with the values of the bit variables that are operands of the bit operational expression being evaluated, and operations such as assigning a value as a result of the bit operational expression and/or executing branching being performed based upon the decision obtained from the condition judgement operation.

By generating object code for each bit operational expression in that way, the number of steps which must be executed by the RISC type CPU to perform each bit operation that is written in the source code can be substantially reduced by comparison with the prior art. Furthermore, since in general a CPU will execute bit operations very frequently during execution of a program, the invention enables the overall amount of object code that is generated for a program to be reduced, while in addition enabling the overall speed of execution to be increased.

In general, the bit variables which are to be operated on will be held in memory beforehand, within respective 8-bit, 16-bit or 32-bit data units, and the requisite data unit for each bit variable will be read out from memory and loaded into a general-purpose register in order to perform a bit judgement operation.

However, according to a second aspect, the invention is also applicable to processing operations performed on a set of bit variables constituting a bit field which is held as a register variable (i.e., in an internal CPU register which is reserved by the program for that purpose). In that case, the invention can be applied to judge the respective values of the bit variables in the bit field, and perform operations such as setting the value of a bit variable, in accordance with the judgement results.

According to a third aspect, the invention provides a program conversion apparatus for a RISC type of CPU, with the program conversion apparatus performing processing whereby a compiler that is stored in memory means of the program conversion apparatus generates object code for a program such that when a bit operational expression is written within the source code of that program, the bit operational expression is converted to a condition judgement expression which makes a decision based on the respective values of bit variables which are operands of the bit operational expression, and such that respectively different values are assigned to a bit variable that is the result of the bit operational expression, in accordance with whether the judgement decision is "true" or "false".

BRIEF DESCRIPTION OF THE DRAWINGS

FIG. 2 is a flow diagram, based on the flow diagram of FIG. 1, showing processing performed through execution of object code which has been generated by the compiler of this embodiment from the source code of a bit operational expression;

FIG. 3 is a program list of mnemonics representing object code which is generated by the embodiment, corresponding to the processing of FIG. 2;

FIG. 7 is a prior art example of object code, corresponding to the program list of FIG. 3.

DESCRIPTION OF PREFERRED EMBODIMENTS

Figure 4:
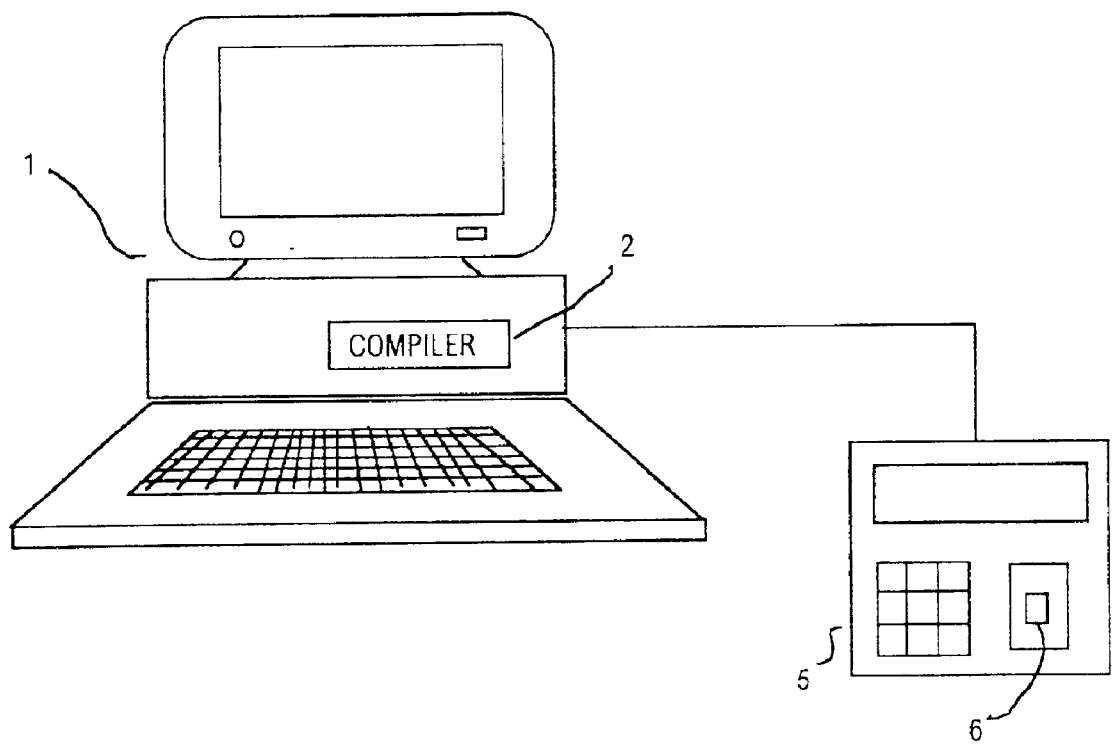
FIG. 4 is a conceptual diagram of a program conversion apparatus constituted by a computer such as a personal computer or workstation.

FIG. 4 is a conceptual diagram for use in describing an embodiment of a program conversion apparatus according to the present invention. The apparatus is made up of a computer which will be assumed to be a personal computer 1 (but might be some other type of computer such as a workstation) having a compiler 2 installed therein. Typically, the compiler 2 would be stored as a program file on a hard disk or other type of internal storage device of the personal computer 1.

Figure 5:
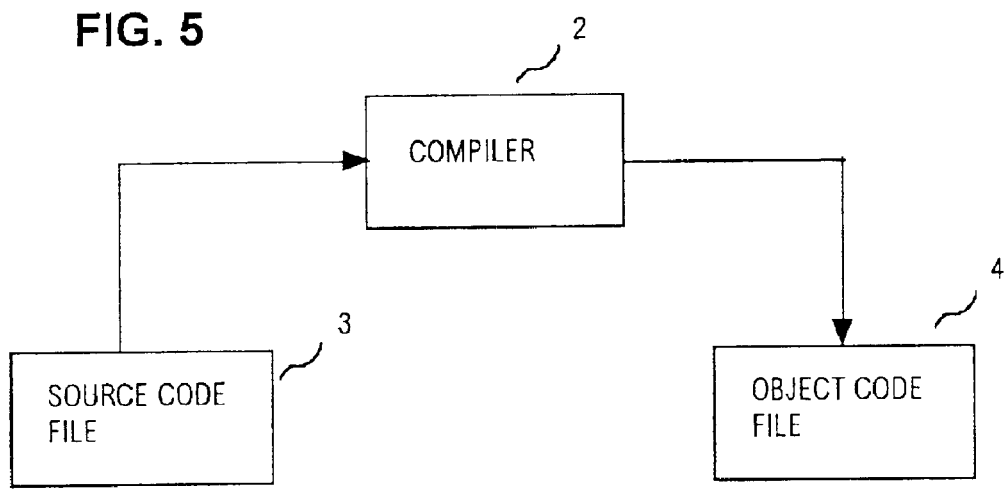
FIG. 5 is a conceptual diagram for illustrating the conversion of a program source code file to an object code file, by the compiler.

It is assumed that, as illustrated in the simple flow diagram of FIG. 5, the personal computer 1 has stored therein, in an internal memory or data storage device, a source code file 3 which is written in a high-level programing language such as C or C++. When a user operates the personal computer 1 to activate the compiler 2, the source code file 3 is converted to an object code file 4. The compiler 2 functions by reading out and interpreting the contents of the source code contained in the source code file 3, to generate object code thereby, with that object code including dedicated bit operation instructions as described hereinafter. When this object code is subsequently executed by a CPU, highly efficient processing is achieved.

The personal computer 1 is connected for transfer of data to a ROM writer 5, e.g., by serial data transfer using the RS-232C protocol, or some other data transfer method. The object code file that is generated by the compiler 2 is thereby transferred from the personal computer 1 to the ROM writer 5, and written by the ROM writer 5 into a program memory 7 (shown in FIG. 6, described hereinafter) of a microcomputer 6.

Figure 6:
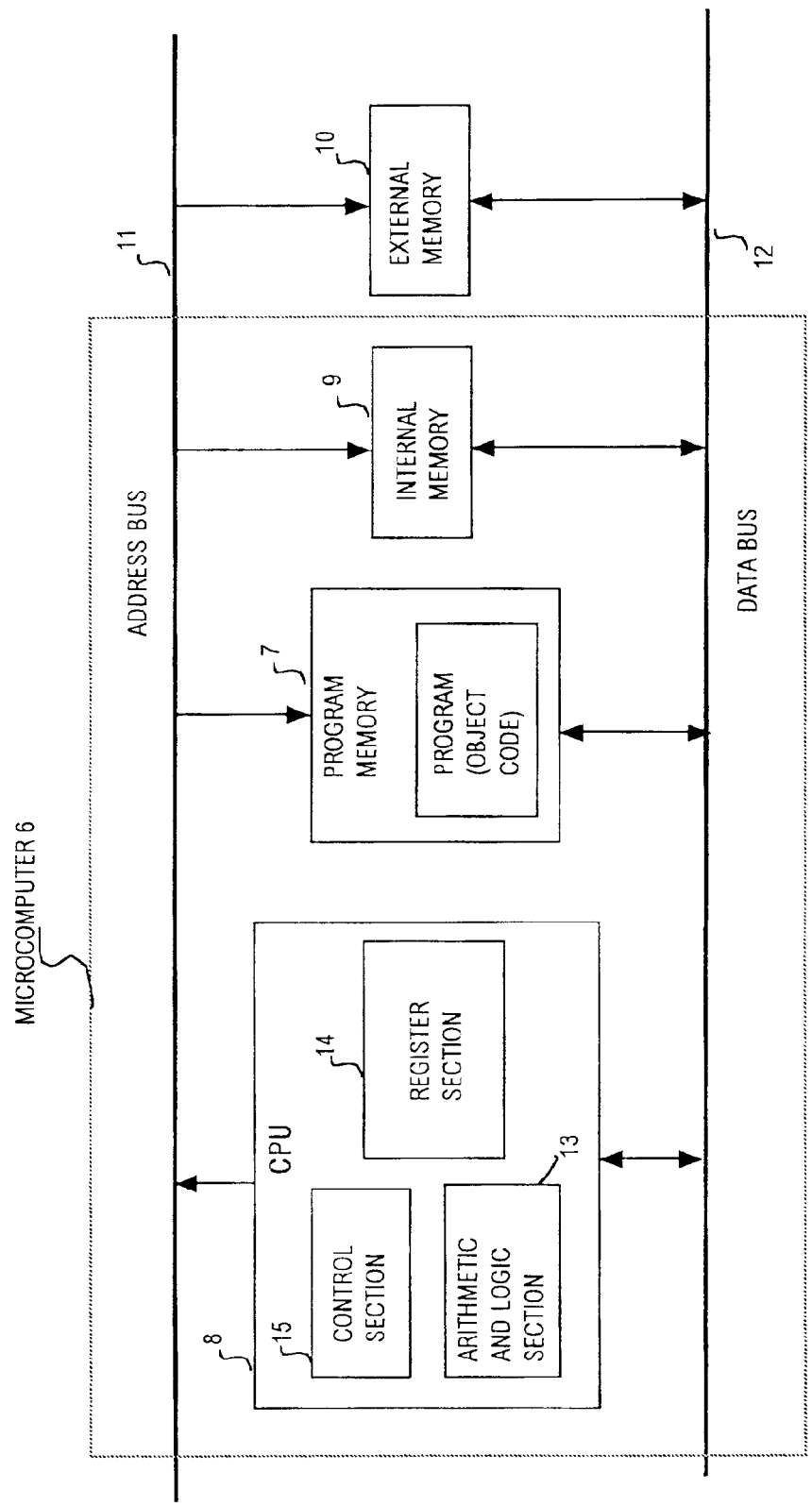
FIG. 6 shows an example of the general electrical configuration of a microcomputer.
Figure 8:
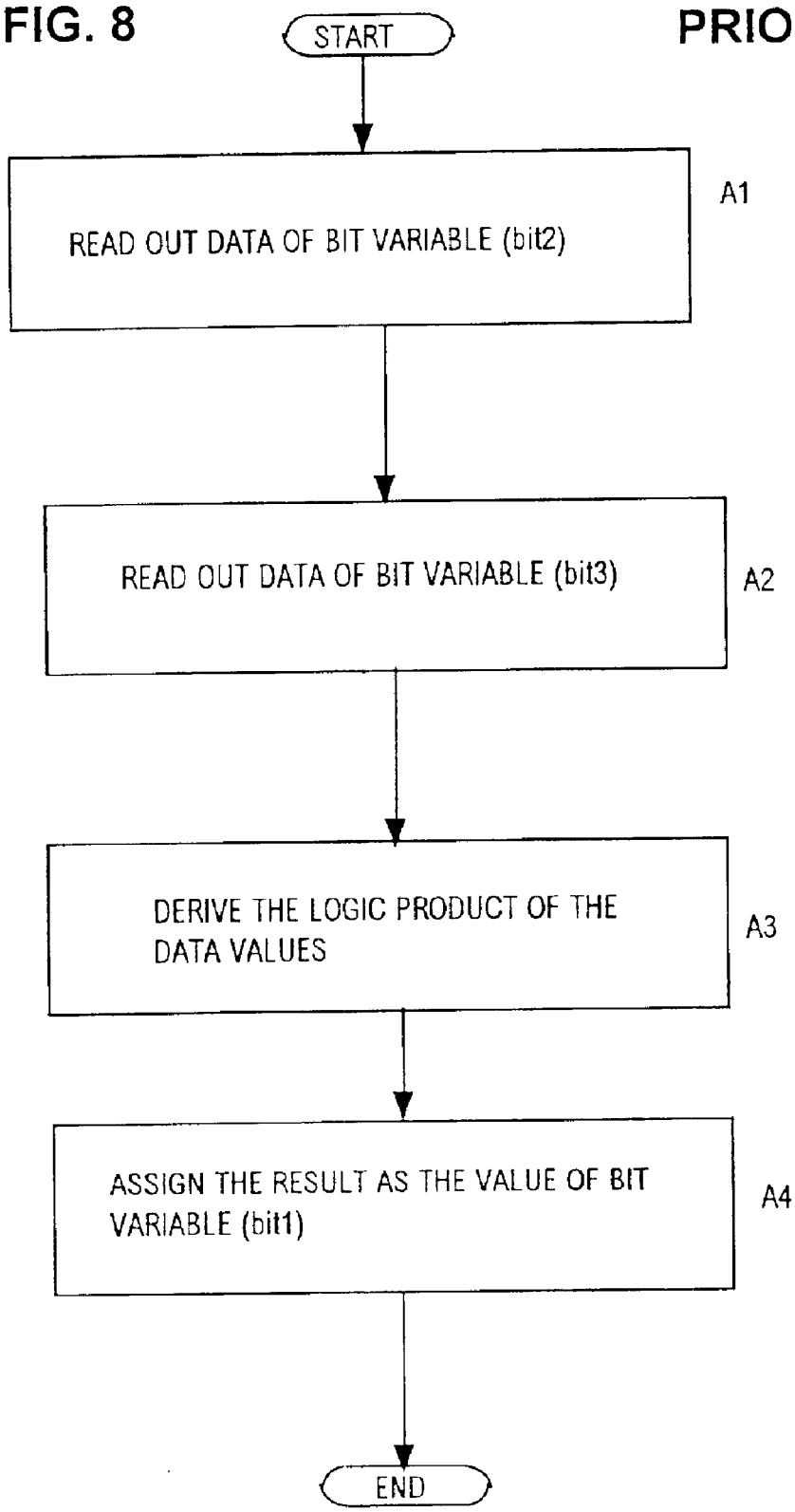
FIG. 8 is a flow diagram of processing performed through execution of object code which has been generated by a prior art compiler from the source code of a bit operational expression.

FIG. 6 is a functional block diagram showing the general electrical configuration of the microcomputer 6. The microcomputer 6 may be configured as a single-chip microcomputer, and is formed of a CPU 8, a program memory 7 such as an EEPROM or a flash ROM, and an internal memory 9 such as a SRAM. An external memory 10 is connected to the microcomputer 6. The CPU 8 is connected to the program memory 7, the internal memory 9 and the external memory 10 by an address bus 11 and a data bus 12. Internally, the CPU 8 is formed of an arithmetic and logic section 13, for controlling calculation processing operations, etc., a register section 14 which is formed of a plurality of registers that are utilized by the arithmetic and logic section 13, and a control section 15 for controlling operations such as loading data into registers of the register section 14, and storing data read out from these registers into memory. Since the general internal configuration and operation of such a type of microcomputer are widely known, detailed description will be omitted.

It is assumed as a precondition that the CPU 8 of this embodiment is configured to be capable of executing at least the following dedicated bit operation instructions:

Bit test instruction: tst (. b/w/l)

Bit set instruction: set (. b/w/l)

Bit clear instruction: clr (. b/w/l)

In the above, ". b/w/l" are a set of access sizes, one of which may be attached to an instruction. The bit test instruction is an instruction for testing (i.e., judging the value of) a specified bit variable. The Z-flag of a CCR (Condition Control Register) within the register section 14 can be set to a state which will affect the subsequent operation of the CPU 8 (i.e., will result in branching to a specified object code instruction) depending upon whether the result of the test is "0" or "1". Specifically, if the test result is "0", then the Z-flag of the CCR is set to "1", while if the test result is "0" then the Z-flag is cleared.

The bit test instruction can be modified to provide the same function irrespective of whether the bit that is to be tested is defined in the source code as having been loaded into a register which is part of the register section 14, or is held only in memory. That is to say, if the bit test instruction is generated in the form "tst", without an access size being specified, then this signifies to the CPU 8 that this operation is to be applied to a bit variable which is held in a register within the register section 14. If the bit test instruction is generated with an access size attached, then this instruction is executed by the CPU 8 on the basis that the bit operand is held only in memory, within a data unit whose size is specified by the access size. Here, the access sizes "b", "W"

and "l" respectively signify data units having respective sizes of a byte (8 bits), a word (16 bits) and a long word (32 bits).

Thus for example, the instruction "tst k" signifies that the instruction is to be applied to the bit variable k which is currently held in a register of the CPU. The instruction "tst. b k", on the other hand, signifies that the 8-bit variable containing the bit variable k is to be read out from memory and loaded into a general-purpose register of the CPU, then the bit test operation is to be executed.

The bit set instruction assigns the value "1" to the specified bit variable, while the bit clear instruction has the effect of assigning the value "0" to the specified bit variable. Each of the bit set and bit clear instructions can have an access size attached thereto, as for the bit test instruction.

Figure 1:
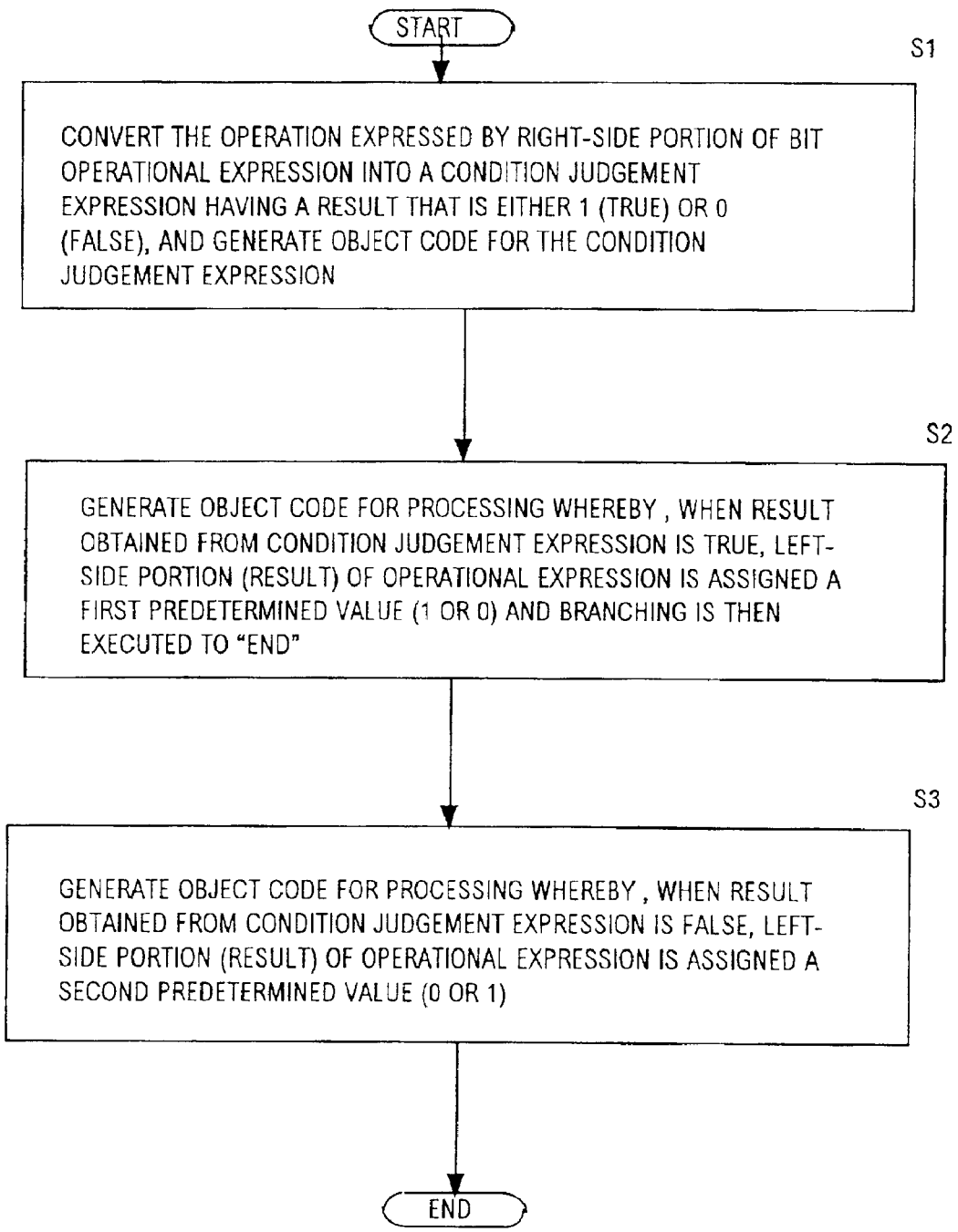
FIG. 1 is a flow diagram for illustrating the basic processing which is executed by a compiler of an embodiment of the invention, applied to a bit operational expression appearing in source code of a program.

The operation of this embodiment will be described referring to FIGS. 1 to 3. FIG. 1 is a basic flow diagram illustrating the processing executed by the compiler 2 in relation to a bit operational expression. Firstly, when the compiler 2 interprets (decodes) the right-side portion of a bit operational expression appearing in the source code, which might be written for example in C language, it converts that bit operational expression into a condition judgement expression which produces a result that is either "1" (i.e., a "true" decision) or "0" (a "false" decision). The compiler 2 then generates object code corresponding to that condition judgement expression (step S1).

Next, the compiler 2 generates object code whereby (when the object code instructions are executed by a CPU) a predetermined first binary value will be assigned to the left-side portion of the bit operational expression (i.e., to the bit variable which constitutes the result of the bit operational expression), if the result of the condition judgement is "true", with branching then being executed to the end of the processing that is executed in relation to the bit operational expression (step S2).

The compiler 2 then generates object code whereby a predetermined second binary value is assigned to the left-side portion of the bit operational expression, if the result of the condition judgement is "false". (step S3). This ends the processing for the bit operational expression.

FIG. 2 is a flow diagram of the processing which is performed through execution of the object code which is generated by the compiler 2, in the case of the aforementioned bit operational expression (1), i.e.

bit1=bit2 & bit3

The result of the bit operational expression (1) will be "1" if the conditions {bit2="1"} and {bit3="1"} are both satisfied. This can be written in C language as a statement defining a condition judgement expression, as follows:

bit2==1 && bit3==1                                        (4)

Hence the processing executed by this embodiment is equivalent to that whereby, if a "true" result is returned by the condition judgement expression (4), the left-side portion of the bit operational expression (1), i.e., the bit variable bit1, is assigned the value "1", while if a "false" result is returned by the condition judgement expression (4) then bit1 is assigned the value "0".

Referring to FIG. 2, firstly in step B1 the value of the bit variable bit2 is judged, and if it is found to be "0", then "0" is assigned to the bit variable bit1, and processing ends. If it is judged in step B1 that bit2 has the value "1", then step B2 is executed to judge the value of the bit variable bit3. If that is found to be "0", then processing goes to step B3 whereby "0" is assigned to bit1, while if bit3 is found to have the value "1", then "1" is assigned to bit1 in step B4. After execution of either of steps B3 or B4, processing ends.

Thus with the flow diagram of FIG. 2, the processing of steps B1 and B2 is based on step S1 in FIG. 1, i.e., when processing moves from either B1 or B2 to step B3, this corresponds to a "false" result being obtained from the condition judgement expression (4). Furthermore the processing of step B3 is based on step S3 of FIG. 1, and when processing moves from step B2 to step B4, this corresponds to the case in which a "true" result is obtained from the condition judgement expression (4). The processing of step B4 is based on step S2 of FIG. 1.

FIG. 3 shows a program list in mnemonic form, of object code which is generated as a result of actual compiler processing by a compiler according to the present invention, corresponding to FIG. 2. In step D1 in FIG. 3, the value of the bit variable bit2 is judged, and in step D2 branching is performed to the instruction label L001 if the value of bit2 is found to be "0" (corresponding to step B1 of FIG. 2). For example, if the value of bit2 is found to be "0", then as described above the Z-flag of the CCR in the register section 14 of the CPU 8 is set, so that branching is executed to the label L001.

Next, in steps D3 and D4, the same processing is applied to the bit variable bit3 as that described above for bit2, with this processing corresponding to step B2 of FIG. 2. The series of steps D1 to D4 correspond to execution of step Si in FIG. 1, with object code being generated which corresponds to the condition judgement expression (4). If branching is executed to the label L001 from either of the steps D2 or D4, this corresponds to a "false" result being obtained from the condition judgement operation. If no branching to label L001 is executed from either of steps D2 or D4, so that the step D5 following step D4 is executed, then this corresponds to the case in which a "true" result is obtained from the condition judgement operation.

In step D5, the value "1" is assigned to the bit variable bit1, then (step D6) branching is executed to the label L002, to end this bit operation processing. This portion of the object code corresponds to execution of step S2 in FIG. 1, and to step B4 in FIG. 2.

In step D7, which corresponds to the case in which a "false" result is returned from the condition judgement operation, the bit variable bit1 is cleared to "0", and the processing ends. This portion of the object code corresponds to execution of step S3 in FIG. 1, and to step B3 in FIG. 2.

Thus, by comparison with the amount of code that is generated by a prior art compiler in such a case, as in the example of FIG. 7, the amount of code that is generated by the compiler 2 is substantially smaller.

The contents of the object code file 4 are thereby generated by the processing performed by the compiler 2, and the file 4 is then transferred from the personal computer 1 to the ROM writer 5, to be written (as binary data) into the program memory 7 within the microcomputer 6 which has been mounted in the ROM writer 5. Thereafter, the CPU 8 of the microcomputer 6 can execute the program constituted by the object code which is stored in the program memory 7.

As described above, the program can be executed irrespective of whether the source code has defined the bit variables bit1 to bit3 as each being held only in the internal memory 9 or in the external memory 10, or as having each been loaded into general-purpose registers within the register section 14. If the bit variables are in the general-purpose registers, then in the case of the example of FIG. 3, step D1 of the object code would be generated as "tst bit2" instead of "tst.b bit2". If however the bit variable bit2 were held only in the internal memory 9 and had not been written into a general-purpose register, then when the step D1 "tst.b bit2" is encountered during execution of the program by the CPU 8, the arithmetic and logic section 13 would read out from memory the contents of the 8-bit variable containing the bit variable bit2, load the 8-bit variable contents into a general-purpose register (such as register reg1, specified in the prior art example of FIG. 7), then judge the value of the specified bit variable. Assuming that the instruction "mov BIT2" of the prior art example shown in FIG. 7 requires one clock cycle (of the CPU 8), then execution of the instruction "tst.b bit2" will require from 2 to 3 clock cycles. Thus there will be an increase in the amount of object code, by comparison with execution of the "tst bit2" instruction, however it can be understood that irrespective of this, the invention enables the total amount of object code that is generated for a program to be substantially reduced by comparison with the prior art, and also enables the program execution time to also be reduced.

Thus with this embodiment, the compiler 2 which is installed in the personal computer 1 generates object code whereby each bit operational expression which is written in source code, in the source code file for a program, is converted into an expression which performs a condition judgement based upon the respective values of the bit variables such as bit2 and bit3 which are operands of the bit operational expression, with a specific binary value then being assigned to the bit variable (e.g., bit1 ) that is to be stored as the result of the bit operational expression, and with that specific binary value being determined in accordance with whether the result of the condition judgement was "true" or "false". An optimized object code file 4 is thereby produced and transferred to be executed by the RISC CPU 8.

Hence, the number of steps required to be executed by the CPU for each of various portions of the program which involve bit variables can be very substantially reduced by comparison with the prior art, and the overall amount of object code that is generated for a program can be significantly reduced, while in addition a substantial increase in processing speed can be achieved when the CPU executes operations involving bit variables.

The program memory 7 of the microcomputer 6 stores the object code that is generated by the compiler 2, and thereafter the CPU 8 of the microcomputer 6 can read out and execute the program as the object code stored in the program memory 7. Since the overall amount of object code that is generated for a program is reduced, the storage capacity required for the program memory 7 is smaller than for the case in which a prior art compiler is utilized. Furthermore since the processing speed that is achieved by the CPU 8 when performing bit operations is increased, the processing power of the microcomputer 6 is enhanced.

It should be noted that the invention is not limited to the above embodiment, but could also have other aspects as follows. Firstly, some programing languages such as C (in conjunction with an appropriate CPU) enable a register of the CPU to be reserved for a bit field (i.e., a set of bit variables, which need not necessarily have a size that is an integral number of bytes) which is used as a register variable. Assuming that a register within the CPU 8 of the above embodiment can be used in this way, then the present invention enables that bit field to be operated on in a similar manner to that described above. Typically, it might be required to determine whether all of the bit variables of the bit field have a specified value, and to set the value of another bit variable (also in a register) in accordance with the result.

For example, as a similar example to that of FIG. 3, if it is assumed that two bit variables bit2, bit3 are constituents of a bit field which has been defined in the source code as a register variable, and a source code statement specifies that a third bit variable (bit1) is to be set to "1" or cleared to "0" in accordance with whether or not both of the bits of that bit field are "1", then the compiler of the above embodiment of the invention would convert such a source code statement into the following object code:

```
        tst    bit2
        beq    L001
        tst    bit3
        beq    L001
        set    bit1
        bra    L002
L001:
        clr    bit1
L002;
```

Furthermore, bit operational expressions are not limited to logic multiplication (i.e. AND) operations, but may consist of logic sum (i.e., OR), or exclusive-OR operations, and the present invention is also applicable to such operations. To perform such operations for example, an instruction such as "bne (not equal)" might be used in place of the branching instruction "beq" in the object code.

It should also be noted that the present invention is not limited to the use of a ROM writer 5 to write object code into a program memory 7. For example, it would be equally possible to use a communication link to transfer the object code for a program from the personal computer 1 to the microcomputer 6 via a serial communication link, to be written into the program memory 7 by the CPU 8 itself.

The program which constitutes the compiler 2 may be stored on any of various types of data storage medium, such as CD-ROM, floppy disk, MO disk, etc. With the contents of the compiler 2 stored in such a manner, the compiler could be read into a main memory of the personal computer 1, and compiler processing then executed.

Furthermore, the invention is not limited to the case in which the microcomputer 6 is a one-chip microcomputer, since it could equally well be a microcomputer having the CPU 8 and the program memory 7 separately mounted on a printed circuit board. In that case, the ROM writer 5 could be connected to the program memory 7 alone, for writing in the object code.

Moreover the program memory is not limited to being a rewritable type of memory, but could be a non-rewritable type such as a mask ROM.

It can thus be understood that the above description of an embodiment is not intended in a limiting sense, and that various modifications to the embodiment could be envisaged which fall within the scope claimed for the invention in the appended claims.

What is claimed is:

1. A compiler for processing computer program source code, to generate object code to be executed by a RISC (Reduced Instruction Set Computer) type of CPU (central processing unit) of a computer, said object code including code for an instruction for judging the value of a bit variable and an instruction for assigning a value to a bit variable, said bit variables being held in a memory of said computer, said source code including a bit operational expression that expresses a result value for a bit variable in accordance with a combination of respective values of a plurality of bit variables, comprising:

a convertor, responsive to input source code, to generate object code, a right-side portion of said bit operational expression in said source code being expressed in the object code as a condition judgement expression that is in accordance with Boolean logic, said condition judgement expression providing a result that is "true" when said combination of respective values has a predetermined first Boolean logic relationship and a result that is "false" when said combination of respective values has a predetermined second Boolean logic relationship, and being expressed as instructions in the object code that selectively assign a predetermined first binary value and a predetermined second binary value that is the inverse of said first binary value to a bit variable which holds a result of said bit operational expression, in accordance with whether a "true" or a "false" decision is obtained from said condition judgement expression.

2. The compiler according to claim 1, wherein a set of bit variables held in an internal register of said CPU can be processed as a register variable, and wherein said condition judgement expression judges the values of respective ones of said set of bit variables.

3. A data storage medium having a compiler as claimed in claim 1 stored therein.

4. The compiler according to claim 1, further comprising a writer, the writer storing the object code generated by the convertor in a memory.

5. A computer readable medium comprising instructions being executed by a computer, the instructions for compiling the contents of a source code file which is stored as a program and generating an object code file whose contents are to be executed by a RISC (Reduced Instruction Set Computer) type of CPU (central processing unit) of a computer, said object code including an instruction for judging the value of a bit variable and an instruction for assigning a value to a bit variable, said bit variables being held in a memory of said computer, said source code file contents including a bit operational expression that expresses a result value for a bit variable in accordance with a combination of respective values of a plurality of bit variables, the instructions for implementing the steps of:

reading out the contents of the source code file; and generating object code responsive to the contents of the source code file, including expressing a right-side portion of said bit operational expression in said source code as a condition judgement expression that is in accordance with Boolean logic in the object code, said condition judgement expression providing a result that is "true" when said combination of respective values has a predetermined first Boolean logic relationship and a result that is "false" when said combination of respective values has a predetermined second Boolean logic relationship and as instructions in the object code that selectively assign a predetermined first binary value and a predetermined second binary value that is the inverse of said first binary value to a bit variable which holds a result of said bit operational expression, in accordance with whether a "true" or a "false" decision is obtained from said condition judgement expression.

6. The computer readable medium according to claim 5, wherein a set of bit variables held in an internal register of said CPU can be processed as a register variable, and wherein said condition judgement expression judges the values of respective ones of said set of bit variables.

7. The computer readable medium according to claim 5, further comprising instructions for implementing the steps of storing the object code in a memory.

8. The computer readable medium of claim 5, further comprising instructions for implementing the steps of executing the object code file contents.

9. A program conversion method for reading out the contents of a source code file which is stored as a program, and generating from said source code file contents an object code file to be executed by a RISC type of CPU of a computer, said object code file including an instruction for judging the value of a bit variable and an instruction for assigning a value to a bit variable, said bit variables being held in a memory of said computer, said source code file contents including a bit operational expression that expresses a result value for a bit variable in accordance with a combination of respective values of a plurality of bit variables, comprising the steps of:

reading out the contents of the source code file, generating object code responsive to the source code file, including expressing a right-side portion of said bit operational expression in said source code as a condition judgement expression that is in accordance with Boolean logic, said condition judgement expression providing a result that is "true" when said combination of respective values has a predetermined first Boolean logic relationship and a result that is "false" when said combination of respective values has a predetermined second Boolean logic relationship and as instructions in the object code that selectively assign a predetermined first binary value and a predetermined second binary value that is the inverse of said first binary value to a bit variable which holds a result of said bit operational expression, in accordance with whether a "true" or a "false" decision is obtained from said condition judgement expression.

10. A program conversion method according to claim 9, wherein a set of bit variables can be held in an internal register of said CPU and processed as a register variable, and wherein said condition judgement expression judges the values of respective ones of said set of bit variables.

11. The program conversion method according to claim 9, further comprising storing the object code in a memory.

12. A microcomputer having a RISC (Reduced Instruction Set Computer) type of CPU (central processing unit) which can execute an instruction for judging the value of a bit variable and an instruction for assigning a value to a bit variable, wherein said microcomputer comprises:

at least one program memory having stored therein a program which has been converted from source code to object code by a compiler, said object code providing that, when a bit operational expression that expresses a result value for a bit variable in accordance with a combination of respective values of a plurality of bit variables appears within said source code, a right-side portion of said bit operational expression is expressed in corresponding instructions in the object code as a condition judgement expression that is in accordance with Boolean logic, said condition judgement expression providing a result that is "true" when said combination of respective values has a predetermined first Boolean logic relationship and a result that is "false" when said combination of respective values has a predetermined second Boolean logic relationship, and a predetermined first binary value and a predetermined second binary value that is the inverse of said first binary value are selectively assigned to a bit variable which holds a result of said bit operational expression, in accordance with whether a "true" or a "false" decision is obtained from said condition judgement expression.

13. A microcomputer as claimed in claim 12, wherein said object code is generated by said compiler such that said program stored in said program memory processes a set of bit variables appearing in said source code as a register variable, which is held in an internal register of said CPU, and wherein said condition judgement expression is applied to each of respective bit variables of said set.

14. The microcomputer as claimed in claim 12, wherein the at least one program memory has stored therein the source code.

15. A compiler for processing computer program source code, to generate object code to be executed by a RISC (Reduced Instruction Set Computer) type of CPU (central processing unit) of a computer, said object code including code for an instruction for judging the value of a bit variable and an instruction for assigning a value to a bit variable, said bit variables being held in a register of said computer, said source code including a bit operational expression that expresses a result value for a bit variable in accordance with a combination of respective values of a plurality of bit variables, comprising:

a convertor, responsive to input source code, to generate object code, a right side portion of said bit operational expression in said source code being expressed in the object code as a condition judgment expression that is in accordance with Boolean logic, said condition judgement expression providing a result that is "true" when said combination of respective values has a predetermined first Boolean logic relationship and a result that is "false" when said combination of respective values has a predetermined second Boolean logic relationship, and being expressed as instructions in the object code that selectively assign a predetermined first binary value and a predetermined second binary value that is the inverse of said first binary value to a bit variable which holds a result of said bit operational expression, in accordance with whether a "true" or a "false" decision is obtained from said condition judgement expression.

16. The compiler according to claim 15, further comprising a writer, the writer storing the object code generated by the convertor in a memory.

17. A computer readable medium comprising instructions being executed by a computer, the instructions for compiling the contents of a source code file which is stored as a program, and generating an object code file whose contents are to be executed by a RISC (Reduced Instruction Set Computer) type of CPU (central processing unit) of a computer, said object code including an instruction for judging the value of a bit variable and an instruction for assigning a value to a bit variable, said bit variables being held in a register of said computer, said source code file contents including a bit operational expression that expresses a result value for a bit variable in accordance with a combination of respective values of a plurality of bit variables, the instructions for implementing the steps of:

reading out the contents of the source file; and generating object code responsive to the contents of the source code file, including expressing a right-side portion of said bit operational expression in said source code as a condition judgement expression that is in accordance with Boolean logic in the object code, said condition judgement expression providing a result that is "true" when said combination of respective values has a predetermined first Boolean logic relationship and a result that is "false" when said combination of respective values has a predetermined second Boolean logic relationship, and as instructions in the object code that selectively assign a predetermined first binary value and a predetermined second binary value that is the inverse of said first binary value to a bit variable which holds a result of said bit operational expression, in accordance with whether a "true" or a "false" decision is obtained from said condition judgement expression.

18. The computer readable medium according to claim 17, further comprising instructions for implementing the steps of storing the object code in a memory.

19. A program conversion method for reading out the contents of a source code file which is stored as a program, and generating from said source code file contents an object code file to be executed by a RISC type of CPU of a computer, said object code file including an instruction for judging the value of a bit variable and an instruction for assigning a value to a bit variable, said bit variables being held in a register of said computer, said source code file contents including a bit operational expression that expresses a result value for a bit variable in accordance with a combination of respective values of a plurality of bit variables, comprising the steps of:

reading out the contents of the source code file, generating object code responsive to the source code file, including expressing a right-side portion of said bit operational expression as a condition judgement expression that is in accordance with Boolean logic, said condition judgement expression providing a result that is "true" when said combination of respective values has a predetermined first Boolean logic relationship and a result that is "false" when said combination of respective values has a predetermined second Boolean logic relationship, and as instructions in the object code that selectively assign a predetermined first binary value and a predetermined second binary value that is the inverse of said first binary value to a bit variable which holds a result of said bit operational expression, in accordance with whether a "true" or a "false" decision is obtained from said condition judgement expression.

20. The program conversion method according to claim 19, further comprising storing the object code in a memory.

* * * * *